United States Patent
Kang et al.

(10) Patent No.: US 10,297,820 B2
(45) Date of Patent: May 21, 2019

(54) ANODE ACTIVE MATERIAL WITH A CORE-SHELL STRUCTURE, LITHIUM SECONDARY BATTERY COMPRISING SAME, AND METHOD FOR PREPARING ANODE ACTIVE MATERIAL WITH A CORE-SHELL STRUCTURE

(71) Applicant: LG Chem, Ltd., Seoul (KR)

(72) Inventors: Yoon-Ah Kang, Daejeon (KR); Yong-Ju Lee, Daejeon (KR); Eun-Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/547,675

(22) PCT Filed: Dec. 15, 2015

(86) PCT No.: PCT/KR2015/013753
§ 371 (c)(1),
(2) Date: Jul. 31, 2017

(87) PCT Pub. No.: WO2016/171368
PCT Pub. Date: Oct. 27, 2016

(65) Prior Publication Data
US 2018/0013142 A1    Jan. 11, 2018

(30) Foreign Application Priority Data

Apr. 22, 2015  (KR) .......................... 10-2015-0056817

(51) Int. Cl.
| | | |
|---|---|---|
| *H01M 4/82* | (2006.01) | |
| *H01M 4/38* | (2006.01) | |
| *H01M 4/131* | (2010.01) | |
| *H01M 4/133* | (2010.01) | |
| *H01M 4/36* | (2006.01) | |
| *H01M 4/485* | (2010.01) | |
| *H01M 4/587* | (2010.01) | |
| *H01M 10/052* | (2010.01) | |
| *H01M 4/02* | (2006.01) | |
| *H01M 4/48* | (2010.01) | |
| *H01M 4/583* | (2010.01) | |
| *H01M 10/054* | (2010.01) | |

(52) U.S. Cl.
CPC ........... *H01M 4/386* (2013.01); *H01M 4/131* (2013.01); *H01M 4/133* (2013.01); *H01M 4/36* (2013.01); *H01M 4/387* (2013.01); *H01M 4/485* (2013.01); *H01M 4/587* (2013.01); *H01M 10/052* (2013.01); *H01M 4/362* (2013.01); *H01M 4/483* (2013.01); *H01M 4/5835* (2013.01); *H01M 10/054* (2013.01); *H01M 2004/027* (2013.01); *Y02E 60/122* (2013.01); *Y02P 70/54* (2015.11); *Y02T 10/7011* (2013.01)

(58) Field of Classification Search
CPC ...... H01M 4/386; H01M 4/131; H01M 4/133; H01M 4/36; H01M 4/387; H01M 4/485; H01M 4/587; H01M 4/362; H01M 4/483; H01M 4/5835; H01M 10/052; H01M 10/0525; H01M 10/054; H01M 2004/027; Y02E 60/122; Y02P 70/54; Y02T 10/7011
See application file for complete search history.

(56) References Cited

U.S. PATENT DOCUMENTS

| | | |
|---|---|---|
| 2007/0224508 A1 | 9/2007 | Aramata et al. |
| 2011/0244334 A1 | 10/2011 | Kawada |
| 2012/0270102 A1* | 10/2012 | Whitacre ............... H01G 11/24 429/205 |
| 2014/0170485 A1 | 6/2014 | Lee et al. |
| 2015/0188127 A1 | 7/2015 | Niimi et al. |

FOREIGN PATENT DOCUMENTS

| | | |
|---|---|---|
| JP | 2007294423 A | 11/2007 |
| JP | 2014044899 A | 3/2014 |
| KR | 20110112216 A | 10/2011 |
| KR | 20130045212 A | 5/2013 |
| KR | 20150040105 A | 4/2015 |

OTHER PUBLICATIONS

International Search Report From PCT/KR2015/013753 dated May 4, 2016.

* cited by examiner

*Primary Examiner* — Raymond Alejandro
(74) *Attorney, Agent, or Firm* — Lerner, David, Littenberg, Krumholz & Mentlik, LLP

(57) ABSTRACT

An anode active material and a method for preparing the same, wherein the anode active material has a core-shell structure having formula (MOx-Liy)-C (here, M is a metal (or metalloid), x is greater than 0 and less than 1.5, and y is greater than 0 and less than 4) and including a core part containing an alloy of a metal (or metalloid) oxide-Li (MOx-Liy) and a shell part containing a carbon material coated on a surface of the core part, wherein the shell part contains lithium in an amount less than 5 atm % in the surface and the inner portion thereof. The anode active material can provide high capacity, excellent cycle characteristics, excellent volume expansion control capability, and high initial efficiency.

8 Claims, No Drawings

US 10,297,820 B2

ANODE ACTIVE MATERIAL WITH A CORE-SHELL STRUCTURE, LITHIUM SECONDARY BATTERY COMPRISING SAME, AND METHOD FOR PREPARING ANODE ACTIVE MATERIAL WITH A CORE-SHELL STRUCTURE

CROSS-REFERENCE TO RELATED APPLICATION

This application is a national phase entry under 35 U.S.C. § 371 of International Application No. PCT/KR2015/013753, filed Dec. 15, 2015, which claims priority to Korean Patent Application No. 10-2015-0056817, filed Apr. 22, 2015, the disclosures of which are incorporated herein by reference.

TECHNICAL FIELD

The present disclosure relates to an anode active material, and more particularly, to an anode active material comprising a core-shell structure composite, a lithium secondary battery comprising the same, and a method for preparing the anode active material.

BACKGROUND ART

Recently, energy storage technologies are receiving continuously increasing attentions. As application areas expand to energies for mobile phones, camcorders and notebook PCs and further to electric vehicles, more systematic efforts are made for the researches and developments of electrochemical devices. In this aspect, electrochemical device area is in the center of the attentions, and development of chargeable and dischargeable secondary batteries is becoming a focus of attention. Recently, in developing such batteries, research and development to design new electrodes and batteries are under way in order to improve capacity density and specific energy.

Among the currently-available secondary batteries, lithium secondary battery developed in the early 1990s is coming into spotlight because of advantages such as higher operating voltage and superior energy density compared to conventional batteries such as Ni-MH, Ni—Cd, lead-sulfate batteries, and the like that use aqueous solution electrolyte. However, lithium ion secondary battery among the secondary batteries mentioned above has disadvantages of safety issues such as ignition and explosion, which may occur due to use of organic electrolyte, and complicated preparation thereof. The lithium-ion polymer secondary battery has recently been suggested as one of next-generation batteries as an improvement to the disadvantages of the lithium ion secondary battery mentioned above. However, relatively lower battery capacity than the lithium ion secondary battery, and particularly, insufficient discharge capacity at low temperature require immediate improvements.

There are increasing demands for high-capacity anode material in order to address the above issues, and metals (metalloids) such as Si, Sn, or the like with high theoretical capacity are applied as the anode active materials. However, such anode active materials provide negative influence on performance and safety of the battery due to deteriorating cycle characteristic and excessive volume expansion with repeated charging and discharging. Accordingly, studies have been conducted to find ways to improve cycle characteristic and alleviate volume expansion, using metal (or metalloid) oxides such as silicon oxide ($SiO_x$), and so on.

However, the metal (or metalloid) oxide has an irreversible phase formed from the initial reaction of oxygen and lithium upon lithium intercalation, which leads to very low initial efficiency.

In order to compensate this, the metal (or metalloid) oxide can be alloyed with lithium in advance in order for the metal (or metalloid) oxide to contain lithium, from which irreversible phases such as lithium oxide, lithium metal oxide and the like are less generated in the initial charging and discharging of the battery, thereby increasing the initial efficiency of the anode active material.

However, there are problems that a by-product of lithium may be generated during reaction of the metal (or metalloid) oxide and a lithium source and remain on the surface of the composite, which lead to the increase of pH in a water-based binder system containing the by-product, making it difficult to mix an anode active material slurry. This alters the properties of a binder present in the slurry, thereby rendering the adhesion of an electrode weak.

DISCLOSURE

Technical Problem

The present disclosure is designed to solve the problems of the related art, and therefore the present disclosure is directed to providing an anode active material with improved cycle characteristic and volume expansion control capability, and suppressed reactivity with a by-product generated from a reaction between a lithium source and a metal (or metalloid) oxide, and a method for preparing the anode active material.

Technical Solution

In order to solve the problem mentioned above, an anode active material is provided, which has a core-shell structure of formula ($MO_x$—$Li_y$)—C (where, M is a metal (or metalloid), x is greater than 0 and less than 1.5, and y is greater than 0 and less than 4), which includes a core part containing an alloy of a metal (or metalloid) oxide-Li (MOx-Liy) and a shell part containing a carbon material coated on a surface of the core part, in which the shell part contains lithium in an amount less than 5 at % in the surface and the inner portion thereof.

Preferably, the shell part may have a thickness of 20 nm to 60 nm.

Preferably, the metal (or metalloid) may be selected from a group consisting of Si, Sn, Al, Sb, Bi, As, Ge, Pb, Zn, Cd, In, Ti, Ga, and an alloy thereof.

Preferably, the metal (or metalloid) may be any one selected from a group consisting of SiO, SnO, $SnO_2$) and a mixture thereof.

Preferably, the core part may have a diameter of 0.05 fall to 30 μm.

Preferably, the carbon material may be crystalline carbon, amorphous carbon, or a mixture thereof.

Preferably, the carbon material of the shell part may be present in amount of 0.05 wt % to 30 wt % based on the weight of the anode active material.

Further, in another aspect of the present disclosure, there is provided a method for preparing an anode active material, including steps of: (S1) coating a carbon material on the surface of a core part containing an oxide of metal (or metalloid); (S2) mixing the material obtained in the step of (S1) with a lithium metal powder, followed by thermal treatment to carry out alloying of lithium and the metal (or metalloid); and (S3) bringing the material obtained in the step of (S2) into acid-treatment.

In another preferred embodiment of the present disclosure, the core-shell structure of the anode active material has pH 7 to 10 in a water-based system.

In another preferred embodiment of the present disclosure, the acid-treatment may be carried out using at least one acid selected from a group consisting of hydrochloric acid (HCl), perchloric acid, nitric acid, and sulfuric acid. Preferably, the acid used in the acid-treatment has a concentration of 0.5 M to 3 M.

In another preferred embodiment of the present disclosure, the acid-treatment may be carried out for 0.5 to 5 hours.

In another preferred embodiment of the present disclosure, the metal (or metalloid) may be selected from a group consisting of Si, Sn, Al, Sb, Bi, As, Ge, Pb, Zn, Cd, In, Ti, Ga, and an alloy thereof.

In another preferred embodiment of the present disclosure, the metal (or metalloid) may be any one selected from a group consisting of SiO, SnO, $SnO_2$ and a mixture thereof.

In another preferred embodiment of the present disclosure, the core part may have a diameter of 0.05 μm to 30 μm.

In another preferred embodiment of the present disclosure, the carbon material may be crystalline carbon, amorphous carbon, or a mixture thereof.

In another preferred embodiment of the present disclosure, the carbon material of the shell part may be present in amount of 0.05 wt % to 30 wt % based on the weight of the anode active material.

In another preferred embodiment of the present disclosure, in the alloying step of lithium and the metal (or metalloid), the material obtained in the step of (S1) and the lithium metal powder may be used in a weight ratio of 70:30 to 98:2.

In another embodiment of the preferred embodiment of the present disclosure, there is provided an anode for a lithium secondary battery, comprising: a current collector, and an anode active material layer formed on at least one surface of the current collector and comprising the anode active material prepared by the above-mentioned method.

In another embodiment of the preferred embodiment of the present disclosure, there is provided a lithium secondary battery, comprising: a cathode, the anode according to the present disclosure, and a separator interposed between the cathode and the anode.

Advantageous Effects

The present disclosure provides an anode active material having high capacity, superior cycle characteristic and volume expansion control capability, and high initial efficiency.

Particularly, a metal (or metalloid) oxide-Li alloy ($MO_x$–$Li_y$) is used as the anode active material, to suppress the side reaction due to by-product that may be generated in alloying of lithium.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The anode active material according to an embodiment of the present disclosure has a core-shell structure of formula ($MO_x$–$Li_y$)—C (where, M is a metal (or metalloid), x is greater than 0 and less than 1.5, and y is greater than 0 and less than 4), which includes a core part containing an alloy of a metal (or metalloid) oxide-Li ($MO_x$-$Li_y$) and a shell part containing a carbon material coated on a surface of the core part, in which the shell part contains lithium in an amount less than 5 at % in the surface and the inner portion thereof.

The 'lithium' herein refers to lithium present in a by-product of lithium, and the 'by-product of lithium' herein refers to a un-reacted lithium metal powder, lithium silicate compound, lithium carbonate, and a mixture thereof.

Use of the $MO_x$–$Li_y$, i.e., an alloy of a metal (or metalloid) oxide with lithium can generate less irreversible phase, such as, lithium oxide, lithium metal oxide and the like in the initial charging and discharging of a battery, and thus can increase the initial efficiency of the anode active material. However, there is a problem that a by-product of lithium generated in the synthesis of lithium and the metal (or metalloid) oxide remains on a surface of the anode active material, hindering mixing of an anode active material slurry containing a binder when a water-based binder system is used, and also decreasing the adhesion of the slurry due to altered property of the binder in the slurry.

Accordingly, the present inventors suggest an anode active material, which not only suppresses rapid reaction between lithium and metal (or metalloid) oxide before alloying of lithium with the metal (or metalloid) oxide by a carbon coating serving as a lithium-reaction barrier layer, but also suppresses the by-product of lithium from being contained in one or more of a surface and an inner portion of the shell part after alloying of the metal (or metalloid) oxide and lithium.

The anode active material may have pH 7 to 10. As the above pH range is obtained by suppressing the by-product of lithium, a side reaction is suppressed, thereby providing excellent cycle characteristic and volume expansion control capability.

The shell part may have a thickness of 20 nm to 60 nm.

The core part according to the present disclosure includes an oxide of a metal (or metalloid). The metal (or metalloid) may be selected from a group consisting of Si, Sn, Al, Sb, Bi, As, Ge, Pb, Zn, Cd, In, Ti, Ga, and an alloy thereof, but not limited hereto. The metal(s) (or metalloid(s)) may be present in an oxide form in the core part. Preferably, the oxide of the metal (or metalloid) may include, without limitations, one or more compound selected from a group consisting of SiO, SnO and $SnO_2$, or a mixture of two or more of these. Further, if it is necessary to adjust content of oxygen in the metal (or metalloid) oxide of a final product, any metal (or metalloid) such as the metal (or metalloid) described above may be further included.

In the case that the carbon-coating is absent, a metal crystal phase in the metal (or metalloid) oxide rapidly grows due to uncontrolled reaction between lithium of the lithium metal powder and the metal (or metalloid) oxide. Due to the absence of the carbon-coating, reaction between Si and Li is rapidly led into exothermic reaction, which gives rise to a growth of large Si crystallite in SiO. This increases the volume change of SiO, causing the generation of cracks during charging and discharging.

The carbon material for the carbon coating may include crystalline carbon, amorphous carbon, or a mixture thereof. Further, the carbon material of the shell part may be present in amount of about 0.05 wt % to about 30 wt %, or about 1 wt % to about 20 wt %, based on the weight of the anode active material.

Further, a method for preparing an anode active material according to the present disclosure includes steps of: (S1) coating a carbon material on the surface of a core part containing an oxide of metal (or metalloid); (S2) mixing the material obtained in the step of (S1) with a lithium metal powder, followed by thermal treatment to carry out alloying of lithium and the metal (or metalloid); and (S3) bringing the material obtained in the step of (S2) into acid-treatment.

Accordingly, the present inventors suggest an anode active material, which not only suppresses the rapid reaction between lithium and the metal (or metalloid) oxide before alloying of lithium and the metal (or metalloid) oxide by a carbon coating serving as a lithium-reaction barrier layer, but also removes the Li by-product after alloying of metal (or metalloid) oxide and lithium by acid treatment, thereby suppressing undesirable reaction that may be occurred due to by-product of Li remaining on the surface of the active material. Specifically, such acid-treatment according to the present disclosure can decrease pH of the water-based binder system in the preparation of an anode, and can enhance the surface of the anode active material better than any other type of cleaning process. As a result, the present disclosure has been completed based on a surprising discovery that the property change of the binder in the slurry can be suppressed to provide effects such as enhanced the adhesion of the electrode, and so on.

The step (S1) of coating carbon on a surface of the core part containing the oxide of a metal (or metalloid) may be carried out prior to the alloying of lithium and metal (or metalloid) oxide.

The core part may have a diameter of about 0.05 μm to about 30 μm, or about 0.5 μm to about 15 μm.

When the carbon material of a carbon-coating layer includes crystalline carbon, the core part and the crystalline carbon may be mixed in a solid phase or liquid phase before coating so that the crystalline carbon may be coated on the core part.

Mixing in solid phase may mainly involve a mechanical mixing method, including a mechanical mixing such as kneading, or a method carried out by modifying the wing structure of a mixer in order to apply shear stress during mixing, or a mechanochemical method for inducing fusion between the surfaces of materials by mechanically applying shear stress between the materials.

Mixing in liquid phase may involve mechanical mixing similar to mixing in solid phase, or spray drying, spray pyrolysis, or freeze drying. A solvent added for the mixing in liquid phase may include water, organic solvent, or a mixture thereof, and the organic solvent may include ethanol, isopropyl alcohol, toluene, benzene, hexane, tetrahydrofuran, and the like.

Coating of the amorphous carbon may involve a method of coating with an amorphous carbon precursor and carbonizing the carbon precursor with thermal treatment. The coating method may involve dry mixing or wet mixing, or both. Further, deposition method such as a chemical vapor deposition (CVD) using carbon-containing gas such as methane, ethane, propane, ethylene, acetylene, and the like may be used as well. The amorphous carbon precursor may include resins, such as phenol resins, naphthalene resins, polyvinyl alcohol resins, urethane resins, polyimide resins, furan resins, cellulose resins, epoxy resins, or polystyrene resins, or coal-based pitch, petroleum-based pitch, and tar or low molecular weight heavy oils.

In the step of (S2), lithium is alloyed with the metal (or metalloid) oxide by mixing lithium metal powder with the material obtained in the step of (S1), followed by thermal treatment. The composite formed in the step of (S1) may be mixed with the lithium metal powder by dry mixing, or the like.

The dry mixing enables convenient dry mixing of the lithium metal powder and the composite described above, and in this case, any mixing equipment generally known may be used without limitations. For example, a shaker, a stirrer, or the like may be used. Following the mixing step described above, generally known thermal treatment step is performed.

The composite formed in the step of (S1) and the lithium metal powder may be mixed with a weight ratio of about 70:30 to about 98:2. Such mixing ratio is the values set in consideration of the fact that lithium is extremely light metal, because it is difficult that the lithium is mixed in a weight ratio exceeding the values described above, relative to the composite.

When the weight ratio of the lithium metal powder is less than 2, the content of lithium in the final product is too low and thus the initial efficiency is not high enough. When the weight ratio of the lithium metal powder exceeds 30, lithium oxide or lithium silicate which are inactive phases in the final product may be excessively generated, causing a problem of decreasing discharge capacity per unit weight and bringing the metal (or metalloid) into reaction of alloying with lithium. Such lithium oxide or lithium silicate is relatively stable phase, but when a lithium-metal (or metalloid) compound, e.g., Li—Si compound, is left outside, they become unstable. For example, when about 10 wt % of lithium metal powder is mixed with the composite, initial efficiency may reach almost 90%.

By thermal treatment of the mixture formed as described above, alloying of a metal (or metalloid) oxide-Li is achieved in the core part. In order to form the metal (or metalloid) oxide and Li alloy in the core, the carbon coating layer of the composite formed in the step of (S1) should be present as a carbon material. The reason for this has already been explained above with reference to the anode active material.

The mixture of the composite formed in the step of (S1) and the lithium metal powder requires thermal treatment in order to form an alloy of metal (or metalloid) oxide-Li.

When the mixture is annealed under inactive atmosphere in a reactor, the metal (or metalloid) oxide and lithium react with each other to form a new combination, in which lithium may be present in the form of a lithium oxide or lithium-metal (or metalloid) oxide.

In thermal treatment, a temperature range is not specifically limited to a specific range, as long as it is between a melting point and a boiling point of the lithium metal powder. If the temperature is less than the melting point of the lithium metal powder, the reaction of the lithium metal powder and metal (or metalloid) oxide may not occur. If the temperature is higher than the boiling point of the lithium metal powder, the lithium metal powder may evaporate in a gas form before lithium sufficiently reacts with metal (or metalloid) oxide. Accordingly, the temperature range of the thermal treatment may be preferably from about 500° C. to about 2,000° C. or from about 700° C. to about 1,200° C.

For example, when SiO as a metal (or metalloid) oxide is mixed with lithium, the thermal treatment of the mixture may be performed preferably at a temperature of 1,100° C. or less. This is because SiO has a strong tendency of being separated into SiO2 and SiO and growing at a temperature exceeding 1,100° C. which may in turn compromise the advantage of SiO volume control. Accordingly, the thermal treatment may be performed preferably at a temperature between a melting point of the lithium metal powder and a boiling point of the lithium metal powder, considering a type of metal (or metalloid) oxide.

Further, the thermal treatment may be preferably performed under an inactive gas atmosphere in the presence of nitrogen gas, argon gas, helium gas, krypton gas or xenon gas so as to prevent contact with oxygen. During thermal treatment of the mixture, the mixture contacting oxygen may cause the lithium source and oxygen to react together with the metal oxide to form a lithium oxide or lithium metal oxide, thereby deteriorating the initial efficiency enhancement effect of the battery.

In the alloy of metal (or metalloid) oxide-Li, the oxygen content of the metal (or metalloid) oxide is $MO_x$ ($0<x<1.5$), and when x exceeds 1.5, a relative amount of the electrochemical reaction site, i.e., the relative amount of the metal (or metalloid) M is so low that it can cause reduction of the overall energy density, and also cause a problem of deteriorated initial efficiency.

According to an embodiment, there is the shell part as a coating layer of the carbon material provided on a surface of the core part of the metal (or metalloid) oxide of the present disclosure, and the carbon layer shell part of the carbon material interferes with oxygen from passing therethrough, while allowing lithium to pass, and thus can prevent oxygen from reacting with the metal (or metalloid) oxide on the core part. Accordingly, it is easy to adjust the oxygen content of metal (or metalloid) oxide.

Further, in the step of (S3), the material obtained in the step (S2) is brought into acid-treatment. The material obtained in the step (S2) has a problem when being applied to the water-based system, because the viscosity of the slurry changes due to property change of the binder, and gas is generated in the slurry over time. However, by carrying out the acid-treatment in the step of (S3), the viscosity of the slurry does not change and gas is not generated over time.

The acid-treatment step may be carried out using at least one acid selected from a group consisting of hydrochloric acid (HCL), perchloric acid, nitric acid and sulfuric acid. Among these, the hydrochloric acid is most preferable because it can be applied without damaging other characteristics of the active material, while exclusively removing lithium by-product on the surface of the active material. Removing the lithium by-product may involve removal of a portion or the entire portion of the lithium by-product on the carbon coating layer.

The concentration of the acid may be 0.5 M to 3 M, preferably. When the concentration of the acid is lower than 0.5 M, the effect of the acid-treatment may be incomplete due to low concentration of the acid, and when concentration of the acid is higher than 3 M, other characteristics of the active material may be deteriorated due to high concentration of the acid.

The acid-treatment may be performed for 0.5 to 5 hours.

The acid-treatment may be performed in a batch method accompanied with the stirring.

Further, the anode active material according to the present disclosure may be prepared as the anode according to a preparation method used in a related art. For example, the anode active material may be mixed with a binder and a solvent, and if necessary, a conductor and a dispersant, followed by stirring to obtain a slurry, and the slurry is coated on a current collector, followed by pressing to prepare an electrode. Specifically, the anode active material according to the present disclosure has pH 7 to 10 when using the aqueous solvent in the preparation of the anode, and improves the problem of the related art in which pH increases in the water-based system due to the by-product of Li generated in the alloying of lithium and metal (or metalloid) oxide.

The 'water-based system' as used herein refers to a system that uses water for a dispersion medium of the binder, and pH represents a measurement obtained by titrating a filtered solution of 1 g of active material dispersed in 10 g of distilled water with 0.1 M HCl up to about 4 pH.

Further, a cathode used in the present disclosure may be prepared with a known method, similar to the anode.

The binder may be one or a mixture of two or more selected from a group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose, (CMC), acrylonitrile-styrene-butadiene copolymer, polyimide, polyvinylidenefluoride, polyacrylonitrile and styrene butadiene rubber (SBR).

The cathode active material may preferably include a Li-containing transition metal oxide, such as, for example, at least one selected from a group consisting of $Li_xCoO_2$ ($0.5<x<1.3$), $Li_xNiO_2$ ($0.5<x<1.3$), $Li_xMn_2O_2$ ($0.5<x<1.3$), $Li_xMn_2O_4$ ($0.5<x<1.3$). $Li_x$ $(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x$ $(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}CO_zO_4$ ($0.5<x<1.3$, $0<z<2$), $Li_xCoPO_4$ ($0.5<x<1.3$) and $Li_xFePO_4$ ($0.5<x<1.3$).

The Li-containing transition metal oxide described above may be coated with metal such as aluminum (Al) or metal oxide. Further, besides the aforementioned Li-containing transition metal oxide, sulfides, selenides, halides and the like may also be used.

After preparing the electrodes, a separator is interposed between the cathode and the anode and an electrolyte is injected to prepare a lithium secondary battery. The separator and the electrolyte may be those which are conventionally used in a related art.

The electrolyte used in the present disclosure comprises a lithium salt that is conventionally used in lithium secondary batteries, without limitation. For example, the lithium salt may have any negative ion selected from a group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present disclosure comprises the known organic solvents that is conventionally used in lithium secondary batteries, without limitation. Representative examples of the organic solvent which may be used in the present disclosure include at least one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfuroxide, acetonitrile, dimethoxyethane, diethoxyethane, vinylene carbonate, sulfolane, gamma-butyrolactone, propylene sulphate, tetrahydrofuran, fluoro-ethylene carbonate (FEC) and propionate ester such as methyl-propionate, ethyl-propionate, propyl-propionate, and butyl-propionate. In particular, cyclic carbonate such as ethylene carbonate and propylene carbonate among the carbonate-based organic solvents is preferred because it corresponds to a high viscosity organic solvent and thus has a high dielectric constant and dissociates the lithium salt from the electrolyte well, and it is more preferred to mix the cyclic carbonate with linear carbonate having low viscosity and low dielectric constant such as dimethyl carbonate and diethyl carbonate at a proper mixing ratio to prepare an electrolyte solution having high electrical conductivity.

Optionally, the electrolyte used in the present disclosure may further comprise an additive such as an overcharge inhibitor that is conventionally used in an electrolyte.

Also, the separator may be made of a common porous polymer film used in conventional separators, fabricated from a polyolefin polymer, such as for example, ethylene homopolymer, propylene homopolymer, ethylene/butene copolymer, ethylene/hexene copolymer, ethylene/methacrylate copolymer or the like, either solely or by depositing the same, or otherwise, a common porous non-woven fabric, for example, a non-woven fabric made of glass fiber of a high inciting point, polyethylene terephthalate fiber and the like may be used, but there is no limitation thereto.

Optionally, the separator may additionally include a porous coating layer on the surface thereof. The porous coating layer includes inorganic particles and the binder. The binder is positioned in a portion or the entire portion of the inorganic particles to serve a function of connecting and fixing between the inorganic particles.

As the inorganic particles, an inorganic particle having a dielectric constant greater than or equal to 5 and an inorganic particle having a lithium ion delivery capability (in a case of a lithium secondary battery) may be used singularly or in combination. The inorganic particle having a dielectric constant greater than or equal to 5 may be any one selected from the group consisting of $BaTiO_3$, $Pb(Zr_x,Ti_{1-x})O_3$(PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures of two or more thereof. The inorganic particle having a lithium ion delivery capability may be, as a non-limiting example, any one selected from the group consisting of lithium phosphate ($Li_3PO_4$), lithium titanium phosphate ($Li_xTi_y(PO_4)_3$,$0<x<2$, $0<y<3$), lithium titanium aluminum phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthan titanate ($Li_xLa_yTiO_3$, $0<x<2,0<y<3$), lithium germanium thio phosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$,$0<x<3$, $0<y<2,0<z<4$) and $P_2S_5$-based glass ($Li_xP_yS_z$, $0<x<3$, $0<y<3$, $0<z<7$) or a mixture of two or more thereof. There is no particular restriction on the average particle diameter of the inorganic particles, but the average particle diameter of the inorganic particles may preferably be in a range of 0.001 μm to 10 μm, considering forming of porous coating layer with uniform thickness and proper porosity. When the average particle diameter of the inorganic particles satisfies the above range, the dispersion deterioration of the inorganic particles may be prevented, and the porous coating layer may be adjusted at a proper thickness.

The binder may be used in amount of about 0.1 to about 20 parts by weight, preferably, in a range of about 1 to about 5 parts by weight, based on the total 100 parts by weight of the binder and the inorganic particles. As non-limiting example, the binder may be any one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile and styrene butadiene rubber (SBR), or mixtures of two or more thereof.

A battery case used in the present disclosure may employ those generally used in the art, and is not limited to a specific outer shape based on a use of a battery, and the battery case may have, for example, a circular shape using a can, a prismatic shape, a pouch shape, a coin shape, and the like.

Hereinafter, the present disclosure will be described in detail with reference to preparative examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in a related art.

PREPARATIVE EXAMPLES 10 g of SiO having an average particle diameter of 5 μm as a metal (or metalloid) oxide was put into a rotary tube furnace, and the temperature of the furnace was increased to 1000° C. at a rate of 5° C./min after flowing argon gas at a rate of 0.5 L/min. Thermal treatment was performed for 2 hours while rotating the rotary tube furnace at a rate of 10 rpm/min and flowing argon gas at a rate of 1.8 L/min and acetylene gas at a rate of 0.3 L/min, to manufacture a composite having carbon coating layer on the surface of SiO as a core part.

The carbon coating layer had a carbon content of 5.3 parts by weight based on 100 parts by weight of the core part. Also, it was observed from TEM analysis that the carbon coating layer was 40 nm thick.

The manufactured composite was mixed with lithium metal powder at a weight ratio of 92:8 to form a mixture. The mixture was thermally treated at 700° C. for 5 hours under Ar atmosphere to alloy the lithium with the core part.

Examples 1 to 4, and Comparative Examples 1 to 6

It was aimed to remove a by-product of lithium from the alloyed composite prepared in the preparative example with HCl, by performing etching in the form of a batch, accompanied with stirring.

The removal of the by-product of lithium may involve removal of a portion or the entire portion of the lithium by-product from the carbon coating layer.

The removal was performed while varing the concentration of the used HCl and etching time, and the results are shown in Table 1 below.

Comparative Example 7

The alloyed composite according to the Preparative Example was washed with distilled water.

TABLE 1

|  | HCl Concentration (M) | Etching Time (Hr) |
|---|---|---|
| Preparative Example 1 | 0.5 | 5 |
| Preparative Example 2 | 2 | 3 |
| Preparative Example 3 | 3 | 0.5 |
| Preparative Example 4 | 0.5 | 2 |
| Comparative Example 1 | 0.1 | 0.5 |
| Comparative Example 2 | 0.1 | 24 |
| Comparative Example 3 | 6 | 0.5 |
| Comparative Example 4 | 6 | 10 |
| Comparative Example 5 | 6 | 24 |
| Comparative Example 6 | — | — |

Initial efficiency of the active material and gas generation of the water-based slurry in Examples 1 to 4 and Comparative Examples 1 to 5 of the above Table 1 were measured, and the results are shown in Table 2 below.

TABLE 2

|  | Initial efficiency (%) | Gas generation |
|---|---|---|
| Example 1 | 87.4 | X |
| Example 2 | 87.4 | X |
| Example 3 | 87.0 | X |
| Example 4 | 87.9 | X |
| Comparative Example 1 | 88 | ○ |
| Comparative Example 2 | 80 | X |
| Comparative Example 3 | 77 | X |
| Comparative Example 4 | 76 | X |
| Comparative Example 5 | 76 | X |

As shown in the above Table 2, the anode active material of Examples 1 to 4 according to the present disclosure suppressed gas generation in the water-based slurry and had higher initial efficiency.

Lithium atom % was measured according to etching depth of the anode active material prepared in Examples 2 and 4 and Comparative Examples 4 and 6, and the results are shown in Table 3 below.

TABLE 3

|  | Etching depth (nm) | Lithium at % |
|---|---|---|
| Example 2 | 0 | 1.7 |
|  | 25 | 2.1 |
|  | 50 | 3.2 |
|  | 100 | 11 |
| Example 4 | 0 | 1.2 |
|  | 25 | 2.1 |
|  | 50 | 9.8 |
|  | 100 | 11.4 |
| Comparative Example 4 | 0 | 1 |
|  | 25 | 1 |
|  | 50 | 1.1 |
|  | 100 | 1.2 |
| Comparative Example 6 | 0 | 9.9 |
|  | 25 | 7.8 |
|  | 50 | 9.8 |
|  | 100 | 12.3 |

As shown in Table 3 above, Examples 2 and 4 of the present disclosure removed a significant amount of the lithium by-product of the shell part, while Comparative Example 4 removed lithium of the core part by the treatment at high concentration of the acid for a long time and Comparative Example 6 did not remove the lithium by-product.

A pH of the anode active material in Examples 1 to 4 and Comparative Examples 4 and 6 were measured, and the results are provided in Table 4 below.

TABLE 4

|  | pH |
|---|---|
| Example 1 | 9.8 |
| Example 2 | 9.7 |
| Example 3 | 8.75 |
| Example 4 | 10 |
| Comparative Example 1 | 10.8 |
| Comparative Example 2 | 6.9 |
| Comparative Example 3 | 6.9 |
| Comparative Example 4 | 6.8 |
| Comparative Example 6 | 13.6 |
| Comparative Example 7 | 11.2 |

As shown in Table 4 above, Examples 1 to 4 had the pH range listed above as the lithium by-product was removed. However, Comparative Examples 1 to 4 had a relatively lower pH and Comparative Examples 6 and 7 had a relatively higher pH, and the lithium by-product were not properly removed.

The present disclosure has been described in detail. However, it should be, understood that the detailed description and specific examples, while indicating preferred embodiments of the disclosure, are given by way of illustration only, and various changes and modifications in the scope of the disclosure will become apparent to those skilled in the art from this detailed description.

What is claimed is:

1. A method for preparing an anode active material having a core-shell structure, the method comprising:
   (S1) coating a carbon material on the surface of a core part containing an oxide of metal or metalloid to form a composite;
   (S2) mixing the composite formed in the step of (S1) with a lithium metal powder, followed by thermal treatment to carry out alloying of lithium and the metal or metalloid to form a thermally treated material; and
   (S3) bringing the thermally treated material formed by the step of (S2) into acid-treatment to improve an initial efficiency of the anode active material and to suppress gas generation in a water-based slurry,
   wherein the anode active material has a core-shell structure of formula $(MO_x\text{—}Li_y)\text{—}C$,
   wherein M is a metal or metalloid, x is greater than 0 and less than 1.5, and y is greater than 0 and less than 4,
   wherein the acid used in the acid-treatment has a concentration of 0.5 M to 3 M,
   wherein the acid-treatment is carried out for 0.5 to 5 hours, and
   wherein the anode active material having the core-shell structure has pH 8.75 to 10 in a water-based system.

2. The method of claim 1, wherein the acid-treatment is carried out using at least one acid selected from a group consisting of hydrochloric acid (HCl), perchloric acid, nitric acid, and sulfuric acid.

3. The method of claim 1, wherein the metal for metalloid is selected from a group consisting of Si, Sn, Al, Sb, Bi, As, Ge, Pb, Zn, Cd, In, Ti, Ga, and an alloy thereof.

4. The method of claim 1, wherein the metal Or metalloid is any one selected from a group consisting of SiO, SnO, SnO2 and a mixture thereof.

5. The method of claim 1, wherein the core part has a diameter of 0.05 μm to 30 μm.

6. The method of claim 1, wherein the carbon material is crystalline carbon, amorphous carbon, or a mixture thereof.

7. The method of claim 1, wherein the carbon material of the shell part is present in an amount of 0.05 wt % to 30 wt % based on the weight of the anode active material.

8. The method of claim 1, wherein in the alloying of lithium and the metal or metalloid, the composite formed in the step of (S1) and the lithium metal powder is used in a weight ratio of 70:30 to 98:2.

* * * * *